April 18, 1967 S. I. HUSUM 3,314,350
AUTOMATIC DEVICE FOR FILMING FIXED-SIZED
IMAGES WITH VARIED FOCAL LENGTH LENS
Filed April 8, 1964 2 Sheets-Sheet 1

INVENTOR
SERGIU IOAN HUSUM
BY Arthur O. Klein
ATTORNEY

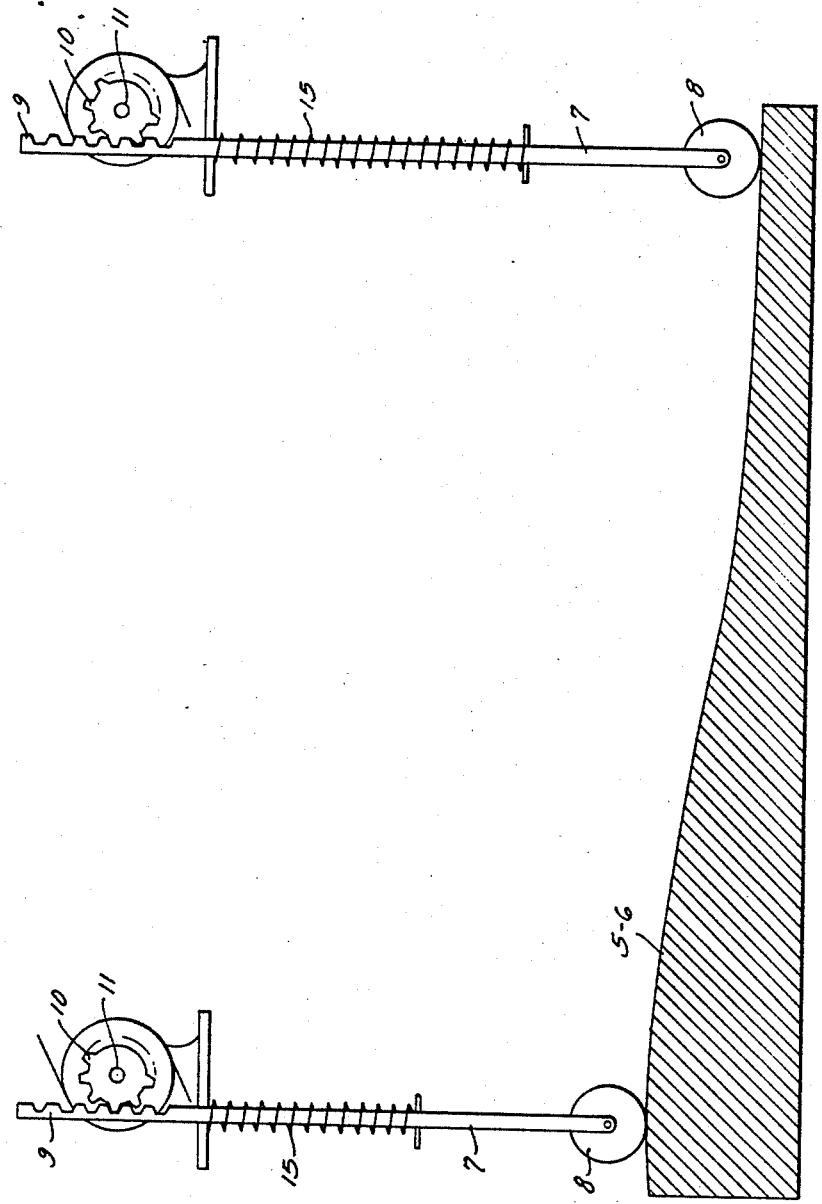

United States Patent Office 3,314,350
Patented Apr. 18, 1967

3,314,350
AUTOMATIC DEVICE FOR FILMING FIXED-SIZE IMAGES WITH VARIED FOCAL LENGTH LENS
Sergiu Ioan Husum, Bucharest, Rumania, assignor to Comitetul de Stat pentru Cultura si Arta, Bucharest, Rumania
Filed Apr. 8, 1964, Ser. No. 358,305
Claims priority, application Rumania, Apr. 8, 1963, 46,286
5 Claims. (Cl. 95—45)

The present invention relates to an automatic photographic camera device for shooting scenes in which the objects situated in a particular given plane are successively photographed as images of constant size, while the perspective of the objects lying in other planes is continuously and selectively varied.

There are already known methods for taking pictures where the camera is kept in motion while shooting so that the size of the images of all the objects lying within the field of the lens is changing continuously. Simultaneously, therewith, the area covered by the lens field changes too. In the aforedescribed known methods constant focal lengths are used so that the angular field, and therefore the perspective are kept unchanged when shooting pictures with the camera.

It is further known to shoot a series of pictures with a zoom lens. In this known method the camera remains stationary, and the focal length is continuously changed which produces the impression that a series of photographed objects travel toward or away from the camera. Simultaneously with the foregoing, there occurs also in the images a change in the angular field and in the perspective.

In a variant to the aforedescribed method the knob controlling the focal length of an objective zoom lens with variable focus of the camera is turned simultaneously with the focusing knob for the variable focus, so that it is possible to obtain a constant size image of an object traveling towards or away from the camera. In this system, as the camera is kept stationary, all fixed objects lying within the angular field of the lens look as through traveling towards or away from the camera. On the other hand this method has the disadvantage in failing to provide means for automatically and directly relating the controls of the camera to the movements of the objects. Consequently, the focal length does not vary uniformly, and the size of the recorded image is not rigorously maintained at a constant quantity which results in an uneven or trembling effect of the image.

It is an object of the present invention to provide an apparatus for taking photographs in which the angular field of the camera lens is varied continuously in order to vary continuously the perspective, while simultaneously therewith, a particular plane lying within the lens field is kept unchanged and all objects situated in this plane are recorded as constant size images. This effect is achieved by shooting a series of pictures with a moving camera provided with a zoom lens. The variation of the focal length of the camera lens is related by connecting means to the movement of the camera in such a manner that if, for example, when the camera approaches the fixed plane, the objects situated in this plane look greater, the focal length is shortened in order to maintain the initial image size. Conversely, if the camera is traveling away from the fixed plane, the focal length is lengthened in order to obtain a constant image size of the objects lying in the aforementioned particular plane.

It is another object of this invention to provide an automatic camera device for shooting pictures in accordance with the aforedescribed method. The focusing and focal length variations are controlled by cam means which act on connecting means of the automatic camera device. The latter is mounted on a dolly movable along said cam means which are designed to vary the focusing and focal length via said connecting means according to a predetermined pattern.

It is a further object of this invention to provide means in the automatic camera device for changing the perspective of the recorded image without the usual pulsations and irregular size variations encountered when shooting pictures with zoom lenses The principles and an embodiment of this invention will become apparent from the following description which will be clearly understood in connection with the accompanying drawings, in which:

FIGURE 3 is a diagrammatic side elevation of the cam and connecting means illustrated in FIG. 2.

Figure 1:
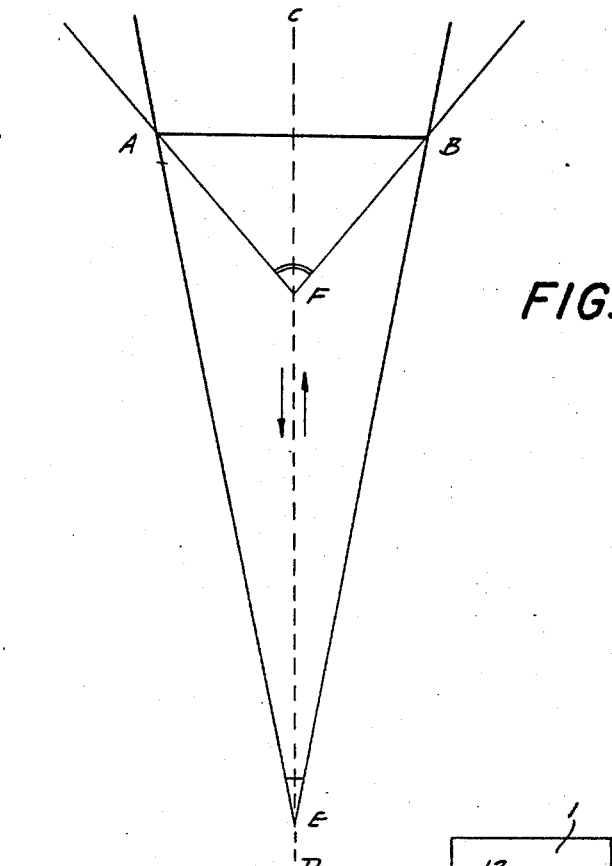
FIG. 1 is a diagrammatic top view of the light paths during a shooting sequence.

Referring now to FIGURE 1, let AB be a straight line lying in a particular plane that must remain unchanged during a shooting sequence. In order to obtain the aforementioned effect, it suffices that (a) the camera moves along a straight line CD which perpendicularly intersects the center of line AB, and (b) the focal length of the camera lens varies in such a manner that the angular field covers, at every moment during the shooting sequence, exactly that part of the plane that must remain unchanged. Thus, when the camera is situated at point E, the focal length should correspond to the angular field AEB, and when the camera is situated at point F, the focal length should correspond to the angular field AFB. It will be noted from FIGURE 1 that while the objects lying in plane AB are recorded as constant size images, the perspective of all objects situated in front and especially beyond plane AB changes considerably. In particular, the variation of the field covered by the camera lens beyond plane AB, is visible.

Figure 2:
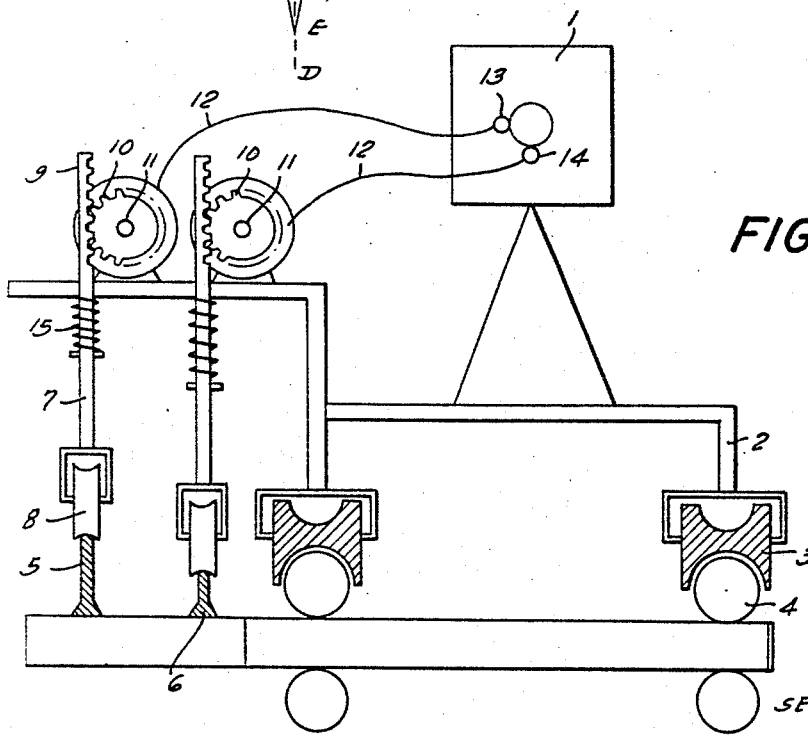
FIG. 2 is a cross-sectional diagrammatic side elevation of the automatic camera device of this invention.

In FIGURES 2 and 3, there is illustrated one embodiment of the invention in which a camera is mounted on a dolly 2 which is movably mounted by means of curved wheels 3 on a pair of tubular rails 4. Two cam surfaces 5 and 6 are mounted alongside the pair of rails 4. Cam surface 5 forms a curve which has been designed according to a predetermined mathematical relationship between the focusing adjusting means and the camera position, and the other cam surface 6 forms a curve which has been designed according to a predetermined mathematical relationship between the focal length adjusting means and the camera position. Two rollers 8 are respectively mounted on a pair of shafts 7 and are respectively biased against the cams 5 and 6 by coil springs 15. The pair of shafts 7 are respectively provided at their upper ends with gear racks 9 which drive a pair of pinion wheels 10 respectively fixedly mounted on rotatable shaft 11. The shafts 11, in turn, transmit their rotational movement via flexible cable 12 to respectively, a gear wheel 13 connected to the focusing control means of the camera 1, and a gear wheel 14 connected to the focal length control means of the camera 1.

It is to be understood that the invention is not limited to the precise details of the one embodiment described above, but includes all equivalent variations and modifications which fall within the scope of the appended claims. For example, the cables 12 may be replaced by electric transmission means. In such a modified embodiment the shafts 11 would drive a first pair of synchromotors which would be connected by electrical wires to a second pair of synchromotors mounted on the camera 1 and which are respectively connected to the focusing and focal length adjusting means of the camera. Furthermore, instead of cam followers having a rectilinear movement, rotatably movable cam followers may be used in the automatic camera device.

The following advantages may be obtained by means of the method and automatic camera device of this invention:

A continuously changing perspective without giving the impression that the camera travels towards or away from a particularly chosen foreground.

A continuously changing perspective without changing the pictorial aspect of the foreground.

A static image for the foreground and a dynamic one for the rest of the space.

A continuously and smoothly changing focal length without the usual trembling of the image caused by manual operation of zoom lenses.

Generally speaking, the provision of new means of artistic expression in cinematography.

I claim:

1. An automatic camera device having zoom lens means and adjustable focusing means, comprising in combination, longitudinally extending cam means in said automatic camera device, a support member movably mounted along said cam means, means responsive to the configuration of said cam means mounted on said support member, said camera means also being mounted on said support member, said zoom lens means and said focusing means forming part of the optical system of said camera means, said means responsive to the configuration of said cam means being operatively connected to said zoom lens means and adjustable focusing means and being adapted to adjust the latter two means in accordance with said configuration of said cam means, whereby said camera means will take a sequence of photographs of all objects lying in a predetermined plane, said objects being recorded as constant size images by said camera means, while all objects lying in other planes are recorded as variable size images thereby changing continuously the perspective of said objects lying in said other planes.

2. The automatic camera device as set forth in claim 1, wherein said cam means comprises a pair of cam surfaces 3. The automatic camera device as set forth in claim 2, wherein said means responsive to the configuration of said cam means comprises a pair of cam followers respectively mounted on said pair of cam surfaces, and reciprocably movably mounted on said support member, flexible shaft means respectively connected to said zoom lens means and said adjustable focusing means, and gear means respectively operatively connecting said flexible shaft means to said pair of cam followers.

4. The automatic camera device as set forth in claim 1, wherein said means responsive to said configuration of said cam means comprises synchromotor means for adjusting said zoom lens means and adjustable focusing means.

5. An automatic camera device having zoom lens means and adjustable focusing means, comprising in combination, control means in said automatic camera device, a support member movably mounted on rails, means responsive to the distance traversed by said support member, means responsive to the action of said control means mounted on said support member, camera means also being mounted on said support member, said zoom lens means and said focusing means forming part of the optical system of said camera means, said control means being responsive to said means responsive to the distance traversed by said support member, the control means being operatively connected to said zoom lens and adjustable focusing means and being adapted to adjust the latter two means in accordance with a predetermined mathematical relation in terms of the distance traversed by the movable support member in order to maintain at constant size the images from a predetermined plane, whereby said camera means will take a sequence of photographs of all objects lying in a predetermined plane, said objects being recorded as constant size images by said camera means, while the objects lying in other planes are recorded as variable seize images, whereby their perspective is changed continuously.

References Cited by the Examiner
UNITED STATES PATENTS 2,518,685  8/1950  Harrison _____ 88—24
3,181,447  5/1965  Keznicki _____ 95—45

FOREIGN PATENTS 1,137,623  10/1962  Germany.

JOHN M. HORAN, *Primary Examiner.*